(No Model.)
3 Sheets—Sheet 1.
W. S. OVENS.
MACHINE FOR MAKING PIES.
No. 262,691. Patented Aug. 15, 1882.
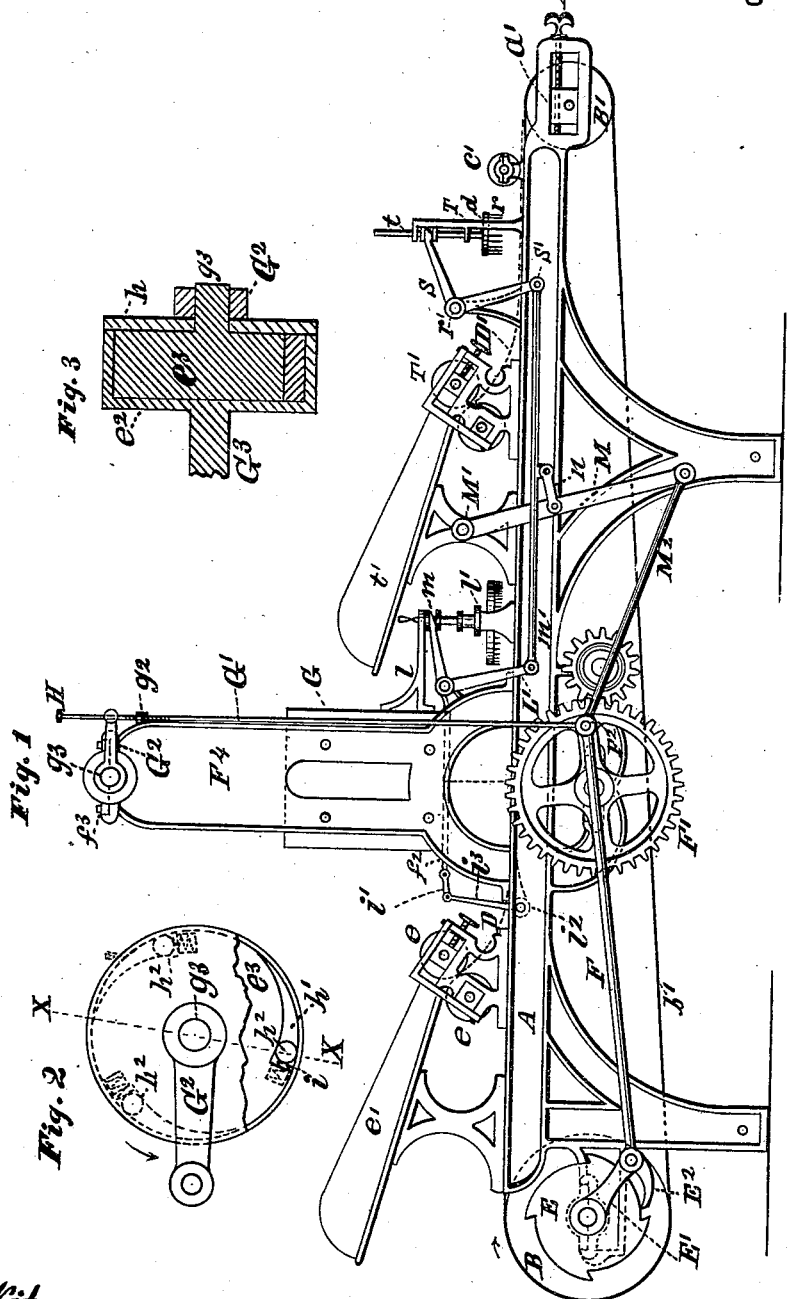
Witnesses.
Inventor
Walter S. Ovens
By James Sangster
Att'y (No Model.)
3 Sheets—Sheet 2.
W. S. OVENS.
MACHINE FOR MAKING PIES.
No. 262,691.
Patented Aug. 15, 1882.
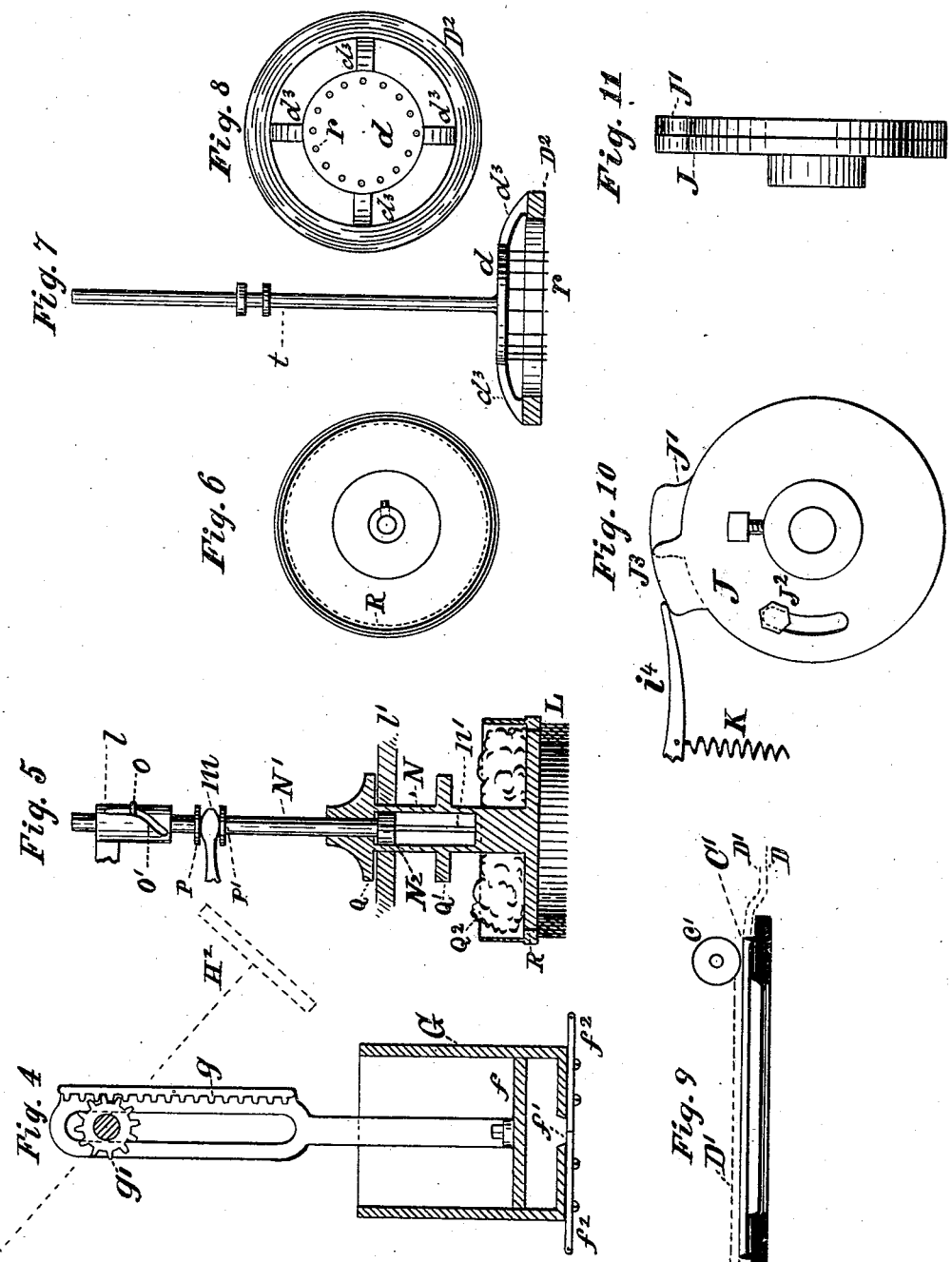

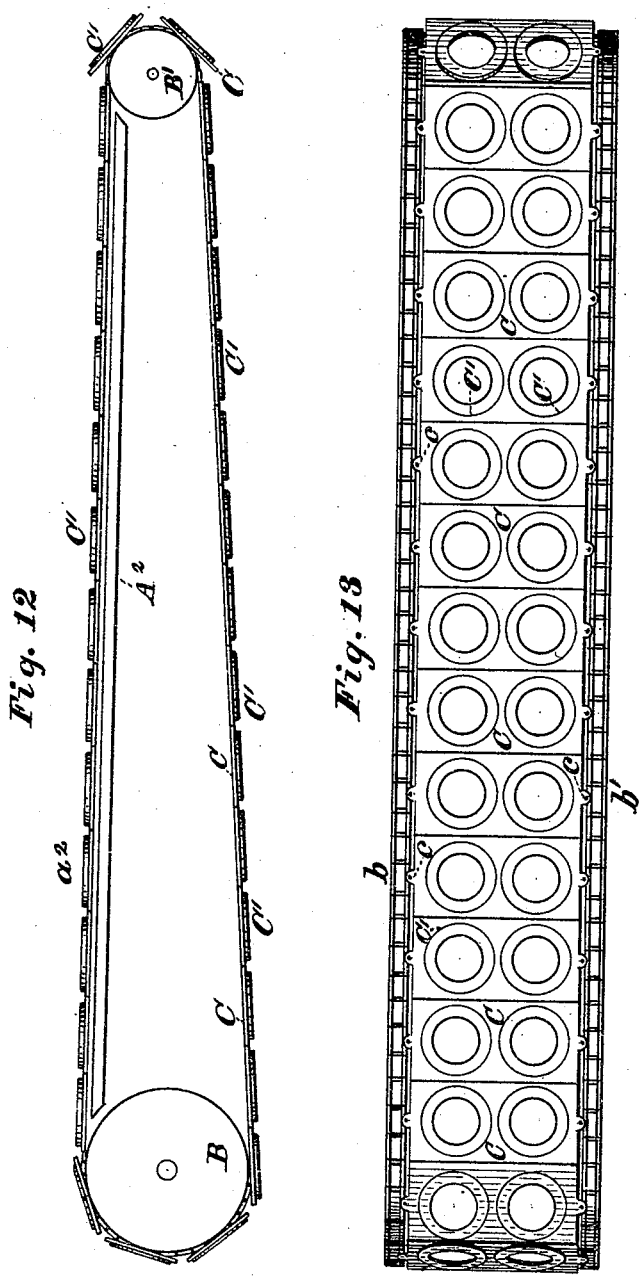

UNITED STATES PATENT OFFICE.

WALTER S. OVENS, OF BUFFALO, NEW YORK, ASSIGNOR TO CHARLES E. BENEDICT AND GEORGE B. WEBSTER, OF SAME PLACE.

MACHINE FOR MAKING PIES.

SPECIFICATION forming part of Letters Patent No. 262,691, dated August 15, 1882.

Application filed October 3, 1881. (No model.)

*To all whom it may concern:*

Be it known that I, WALTER S. OVENS, a citizen of the United States, residing in Buffalo, in the county of Erie and State of New York, have invented a certain new and useful Improvements in Machines for Making Pies, of which the following is a specification.

The object of my invention is to produce a machine for rolling out a sheet of dough and depositing it onto the pie-plates as they move along on an endless pie-plate carrier, then filling the plates with the required quantity of fruit or other material, and then covering them with another sheet of dough, which is firmly fastened to the first at the edges, after which the pies are perforated, their edges trimmed, and then delivered from the endless apron or carrier to the operator, as will be more clearly hereinafter shown by reference to the drawings, in which—

Figure 1 is a side elevation of the machine. Fig. 2 is an enlarged front view of the mechanism for operating the fruit-box plunger, (or a part of said mechanism.) Fig. 3 is a section through line X X, Fig. 2. Fig. 4 represents an enlarged view of a cross-section through the fruit-box and plunger, showing also a side elevation of a portion of the mechanism for operating the plunger. Fig. 5 is an enlarged vertical section through the center of the brush for moistening the edge of the pie preparatory to fastening the upper crust in place, showing also a portion of the mechanism for operating it. Fig. 6 is a plan or top view of the same. Fig. 7 is an enlarged side elevation of the device for perforating the pie, showing also a modified device for trimming the edge of the pie. Fig. 8 is a bottom view of the same. Fig. 9 is an enlarged section through one of the pie-plate holders, showing also a section through a pie-plate, and a roller for showing the manner of trimming the edge of the pie. Fig. 10 is an enlarged side elevation of the adjustable cam for regulating the movements of the valves or knives on the bottom of the fruit-box. Fig. 11 is a face view of the same. Fig. 12 represents a detached side elevation of the mechanism for receiving, holding, and delivering the pie-plates; and Fig. 13 is a plan or top view of the same.

A represents the frame of the machine. It is constructed preferably of cast-iron, as being the cheapest and best material, and is held together by the usual binding-rods, $a$. It is provided with the usual tightening device, $a'$ A', for tightening the belt or endless pie-plate carrier, one being arranged on each side of the machine in the ordinary way. The frame is also provided with a bed, $A^2$, securely fastened to it, for the purpose of supporting the endless carrier as the upper moving portion slides along over it. (See Fig. 12.) The endless pie-plate carrier $a^2$ is supported on the rollers B B', and it consists of the chain-gear $b\ b'$ and a series of plate-holders, C, fastened to the chain-gear by rivets or screws $c$. (See Figs. 12 and 13.) Each plate-holder is provided with a cutting rim or ring, C', formed in one piece with it or securely fastened thereto, and as the endless carrier passes along the upper edge of the cutting-ring C' passes close to and under the roller $c'$. (Shown in Figs. 1 and 9.) It will now be seen that as the endless carrier moves forward it carries the covering sheet of dough D' along with it and under the roller $c'$, and that as the cutting-edge of the ring C' passes under and in contact with said roller the dough within the ring C' will be pressed closely to the top of the pie, while the portions of the dough outside of said ring will be cut off, thereby trimming the edge of the pie.

A modification of the device for trimming the edge of the pie and pressing the upper crust close to the lower crust, D, is shown in Figs. 7 and 8. It consists of a flat annular rim, $D^2$, fastened to the perforating mechanism by arms $d^3$, so that when the perforating device makes a downward movement it will at the same time trim the edge of the pie and press the upper and lower sheets of dough together at or near the periphery of the pie.

The endless plate-carrier and chain-gearing $b\ b'$ are operated by means of the ratchet-wheel E, arm E', pawl $E^2$, and connecting-rod F, which is connected to the wheel F' by a crank-pin, $F^2$. It is obvious that as the wheel F' revolves the connection F will operate the pawl and turn the roller one tooth forward in the direction of the arrow, (see Fig. 1,) and will consequently move the chain-gear and pie-plate carrier one step ahead for every revolution of the wheel F'.

$e$ represents the first pair of rollers, which are all geared together and operated by belts in the ordinary way. $e'$ is the dough-box for said rollers. The first sheet of dough, D, is rolled out by these rollers. The fruit-box G is rigidly fastened to the vertical side frames, $F^4$, (see Fig. 1,) and is provided with an ordinary piston or follower, $f$, for forcing out the fruit or other material from the opening $f'$ when the valves $f^2$ are opened. The follower $f$ is operated by the rack $g$ and pinion $g'$. (See Fig. 4.) The shaft $g^3$, to which the pinion $g'$ is connected, is supported in bearings or boxes $f^3$ on the top of the vertical side frames, $F^4$, (shown in Fig. 1,) and is provided with a box, $e^2$, into which is nicely fitted a block, $e^3$, having a short shaft, $g^3$, which passes through the cap $h$. (See Fig. 3.) The shaft $g^3$ is provided with an arm, $G^2$, through the end of which the upper portion of the rod G' passes, and can move freely until stopped by either the nut $g^2$ or H. The opposite end of the rod G' is connected to the crank-pin $F^2$ on the wheel F', from which it receives its motion. A front view of the block $e^3$ is shown through a portion of the cap which is broken out, and partly in dotted lines. (See Fig. 2.) It is provided with openings $h'$, into which are fitted small rollers $h^2$, having springs $i$ to force them forward toward the narrower portions of the openings $h'$. The effect of this arrangement, it will be readily seen, is that the arm G' will move or turn easily in the direction of the arrow without moving the shaft $G^3$; but if moved in the opposite direction the rollers $h^2$ will be forced against the inclined portions of the block $e^3$ and bind or grip strong enough to move said shaft. The nut H is rigidly fastened to the rod G', and the nuts $g^2$ are adjustable, so as to allow more or less lost motion to the rod G' between them, which can be regulated so as to give more or less motion to the arm $G^2$, and thereby adjust the movement of the follower $f$ downward. The follower $f$ is raised up out of the box G by the usual means and moved out in the position of the dotted lines $H^2$ while refilling or cleaning it. (See Fig. 4.)

The mechanism for operating the fruit-box knives or valves $f^2$ will be understood by reference to Figs. 1, 4, 10, and 11. The valves $f^2$ are connected by a small arm, $i'$, to the vertical portion of an angular arm, $i^3$, which is jointed to the frame, as shown in Fig. 1, at or about the point $i^2$. The outer end of the horizontal portion $i^4$ of the arm $i^3$ rests on the cam J, (see Fig. 10,) which cam is keyed or otherwise fastened to the opposite end of the shaft to which the gear-wheel F' is fastened. The cam-wheel J is composed of two parts, J J', arranged side by side on the shaft, J being keyed to the shaft, so that by turning J' and fastening it by the set-screw $J^2$ the top $J^3$ of the cam may be made longer or shorter. Either one valve $f^2$ or two may be used; but when two are used two adjustable cams will be required. It will now be seen that as the cam turns under the end $i^4$ of the arm it will cause it to move and open the valve, and that in proportion to the length of the top $J^3$ the valve will be held open, and as soon as the part $J^3$ passes the spring K will reverse the motion of the arm and close the valve.

L represents the circular brush for moistening the rim of the pie before the upper sheet of dough, D', is placed on it. This brush is made of soft bristles or other similar material. It has both a vertical and a slight reciprocating turning movement, and is connected to the frame of the machine by supports $l\ l'$, and receives its movements from the angular arm L', jointed to the frame by a pin, $L^2$. Its upper end is provided with a forked portion, $m$, and its lower end is jointed to the rod $m'$, which is connected by a short connection, $n$, to the swinging arm M, which arm is jointed to a support by a pin, M', and it receives its movements from a connecting-rod, $M^2$, jointed to it and to the pin $F^2$ on the wheel F'. The construction of the brush will be better understood by reference to Fig. 5, in which L is the brush. It is connected to a hollow spindle, N, having a vertical shaft, N', provided with a head, $N^2$, arranged to have a free up-and-down movement within the spindle N, but is prevented from turning in it by a groove, $n'$, and a pin or feather on the head $N^2$. The upper end of N' fits into the support $l$, and is kept in place by a pin, O, fastened to the shaft N', and projects through the groove O', which is straight at its upper end and made to incline toward the bottom, as shown in said Fig. 5. The shaft is provided with shoulders P P', between which the forked end $m$ fits. The sleeve N is also provided with shoulders Q Q', to limit its up-and-down movement. The brush (see Fig. 5) is represented at the lowest part of its vertical movement and in position to be in contact with the first sheet of dough on the plate. It will now be seen that if the end $m$ continues to move downward the pin O, as it moves down the slot O', will give the brush a slight rotary movement sufficient to moisten the dough, as before mentioned, and that an upward movement will reverse its action. The brush is kept moist by a sponge, Q, arranged above it, the moisture from which passes through the perforations R to the brush.

The perforating device $d$ receives its movements from the angular forked arm S, which is jointed by a pin, $r'$, to a support on the frame, the lower end being jointed by a pin, S', to the rod $m'$. (See Fig. 1.) It is supported in a frame, T, by the vertical shaft $t$. $r$ is the perforating-pin. Its operation will be easily understood from the drawings. (See Fig. 1.)

T' represents the second pair of rollers. They are provided with the usual dough-box, $t'$, and are operated in the well-known way by belts and pulleys or their equivalents.

I claim as my invention—

1. An endless belt or chain gear and its operating mechanism, having a series of attachments for receiving, holding, and delivering the pie-plates, in combination with a pair of rollers for rolling out the first sheet of dough, a fruit-box and its operating mechanism for supplying the fruit or other material, and a roller for trimming the edge of the pie, substantially as described.

2. The endless belt or chain gear and its operating mechanism, having a suitable device for receiving and holding the plates, substantially as specified, in combination with a pair of rollers for rolling out the first sheet of dough, a fruit-box for supplying the fruit, a circular brush for moistening the dough around near the edge of the pie, a second pair of rollers for rolling out the covering-sheet, and a roller for trimming the edge of the pie, substantially as described.

3. In a pie-machine, the combination of an endless plate-carrier, substantially as described, a pair of rollers for rolling out the first sheet of dough, a fruit-box, and a second pair of rollers and their operating mechanism for rolling out the second sheet of dough, the whole being combined and arranged for joint operation substantially as described.

4. A pie-machine having a first and second pair of rollers, a fruit-box arranged between the first and second pair of rollers, and an endless plate-carrier and their operating mechanism, in combination with a perforating device and a trimming-roller and their operating mechanism, for the purposes described.

WALTER S. OVENS.

Witnesses:
JAMES SANGSTER,
H. SANGSTER.